United States Patent
Kano

(10) Patent No.: US 8,022,676 B2
(45) Date of Patent: Sep. 20, 2011

(54) ELECTRONIC DEVICE

(75) Inventor: Akio Kano, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/770,498

(22) Filed: Apr. 29, 2010

(65) Prior Publication Data

US 2010/0277131 A1 Nov. 4, 2010

(30) Foreign Application Priority Data

Apr. 30, 2009 (JP) ................................. 2009-111285

(51) Int. Cl.
*H02J 7/04* (2006.01)
(52) U.S. Cl. ....................................................... 320/160
(58) Field of Classification Search .................. 320/152, 320/157–159, 160, 162–164; 323/265, 271, 323/282, 285, 351
See application file for complete search history.

(56) References Cited

U.S. PATENT DOCUMENTS

| | | | |
|---|---|---|---|
| 5,170,069 A | 12/1992 | Sakai | |
| 5,818,197 A | 10/1998 | Miller et al. | |
| 5,872,433 A | 2/1999 | Sakai | |
| 6,266,083 B1 | 7/2001 | Sakaegi et al. | |
| 7,649,343 B2 * | 1/2010 | Kamatani | 320/164 |
| 7,791,319 B2 * | 9/2010 | Veselic et al. | 320/158 |
| 2004/0201716 A1 | 10/2004 | Sakaegi | |
| 2009/0243552 A1* | 10/2009 | Jakes et al. | 320/160 |

FOREIGN PATENT DOCUMENTS

| | | |
|---|---|---|
| JP | 62-274875 | 11/1987 |
| JP | 08-126221 A | 5/1996 |
| JP | 11-32444 A | 2/1999 |
| JP | 2000-050522 A | 2/2000 |
| JP | 2001-228393 A | 8/2001 |
| JP | 2000-278877 A | 9/2002 |
| JP | 2002-278877 | 9/2002 |
| JP | 2003-079067 A | 3/2003 |
| JP | 2003-189501 | 7/2003 |
| JP | 2003-189501 A | 7/2003 |
| JP | 2003-309933 A | 10/2003 |
| JP | 2003-348763 A | 12/2003 |

OTHER PUBLICATIONS

Notice of Reasons for Rejection mailed by Japan Patent Office on Aug. 10, 2010 in the corresponding Japanese Patent Application No. 2009-111285.
Notice of Reasons for Rejection mailed by Japan Patent Office on Nov. 2, 2010 in the corresponding Japanese Patent Application No. 2009-111285.

* cited by examiner

*Primary Examiner* — Kenneth J Whittington
(74) *Attorney, Agent, or Firm* — Knobbe, Martens, Olson & Bear LLP

(57) ABSTRACT

According to one embodiment, an electronic device includes a power supply circuit configured to supply, to a battery, a first charge current for a quick charge and a second charge current for a normal charge smaller than the first charge current, the first charge current and the second charge current being generated from a power from the external power supply, and a controller configured to supply the first charge current to the battery to perform a quick charge when a difference value between a first voltage value of the external power supply wherein the power supply circuit supplies a third charge current smaller than the second charge current to the battery and a second voltage value of the external power supply wherein the power supply circuit does not supply the charge current to the battery is smaller than a threshold.

10 Claims, 5 Drawing Sheets

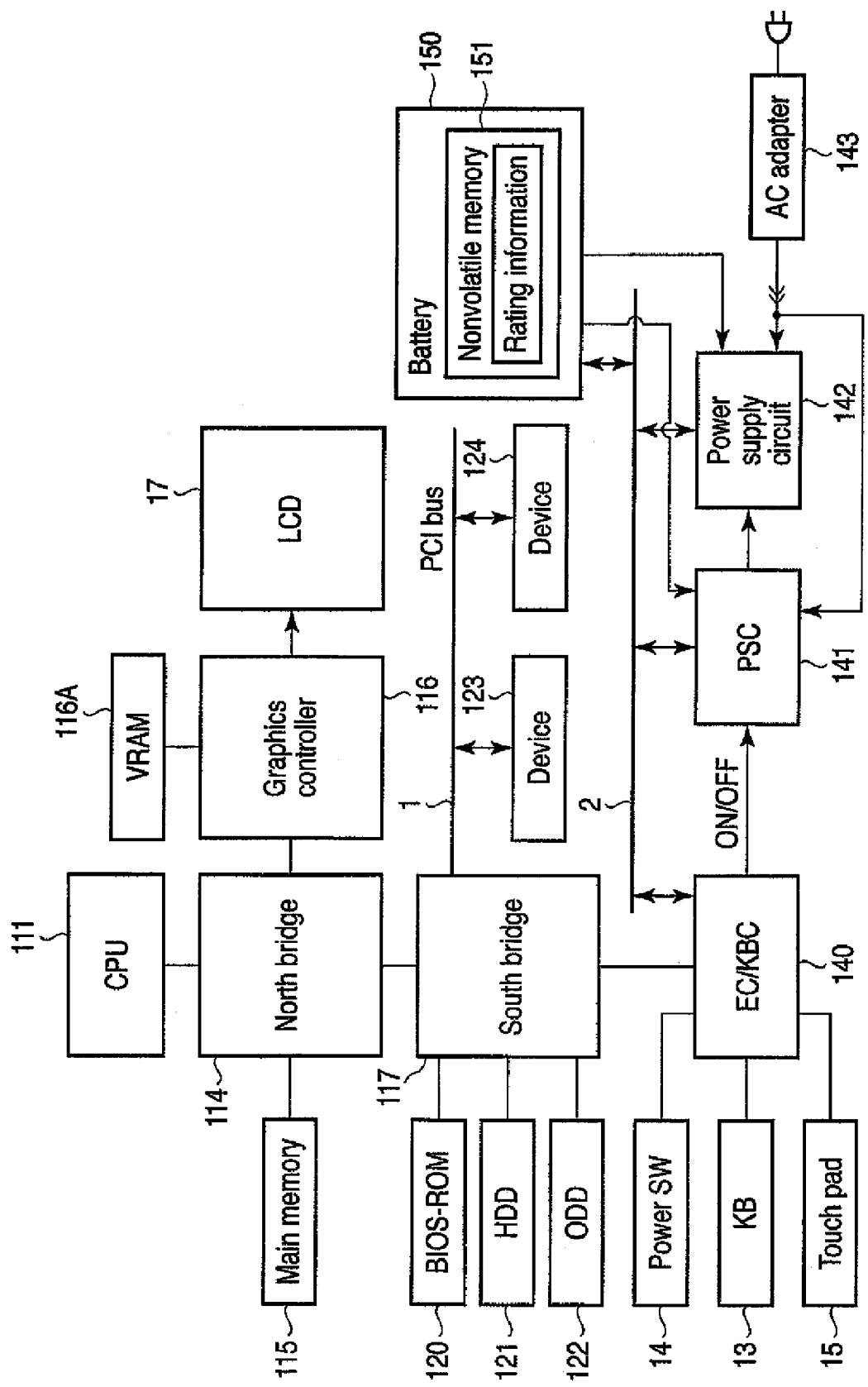
F I G. 2

ELECTRONIC DEVICE

CROSS-REFERENCE TO RELATED APPLICATIONS

This application is based upon and claims the benefit of priority from Japanese Patent Application No. 2009-111285, filed Apr. 30, 2009, the entire contents of which are incorporated herein by reference.

BACKGROUND

1. Field

One embodiment of the present invention relates to an electronic device which controls a charge of a battery for driving an electronic device such as a personal computer.

2. Description of the Related Art

A battery for driving an electronic device such as a personal computer generally uses a chargeable secondary cell. Such a battery is charged using, e.g., an AC adapter serving as an external power supply. If both the AC adapter and the battery support a quick charge, the battery can be charged in a short time. For example, Jpn. Pat. Appln. KOKAI Publication No. 2003-189501 discloses a technique of shortening the battery charge time by making the charge current large without making the supply current of the AC adapter exceed the rated value.

In Jpn. Pat. Appln. KOKAI Publication No. 2003-189501, however, only one kind of AC adapter is used. It is impossible to discriminate a large AC adapter supporting a quick charge and a compact portable AC adapter capable of performing only normal charge and to appropriately control the charge of the battery.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing an exemplary system configuration of the computer shown in FIG. 1.

DETAILED DESCRIPTION

Various embodiments according to the invention will be described hereinafter with reference to the accompanying drawings. In general, according to one embodiment of the invention, an electronic device powered by a battery and an external power supply, includes a power supply circuit configured to supply, to the battery, a first charge current for a quick charge or a second charge current for a normal charge smaller than the first charge current, the first charge current and the second charge current being generated from a power from the external power supply; and a controller configured to supply the first charge current to the battery to perform a quick charge when a difference value between a first voltage value of the external power supply wherein the power supply circuit supplies a third charge current smaller than the second charge current to the battery and a second voltage value of the external power supply wherein the power supply circuit does not supply the charge current to the battery is smaller than a threshold.

An embodiment of the present invention will now be described with reference to the accompanying drawing.

The arrangement of an electronic device according to an embodiment of the present invention will be explained first with reference to FIGS. 1 and 2. This electronic device is implemented as, e.g., a portable notebook type personal computer 10 operable by a battery.

Figure 1:
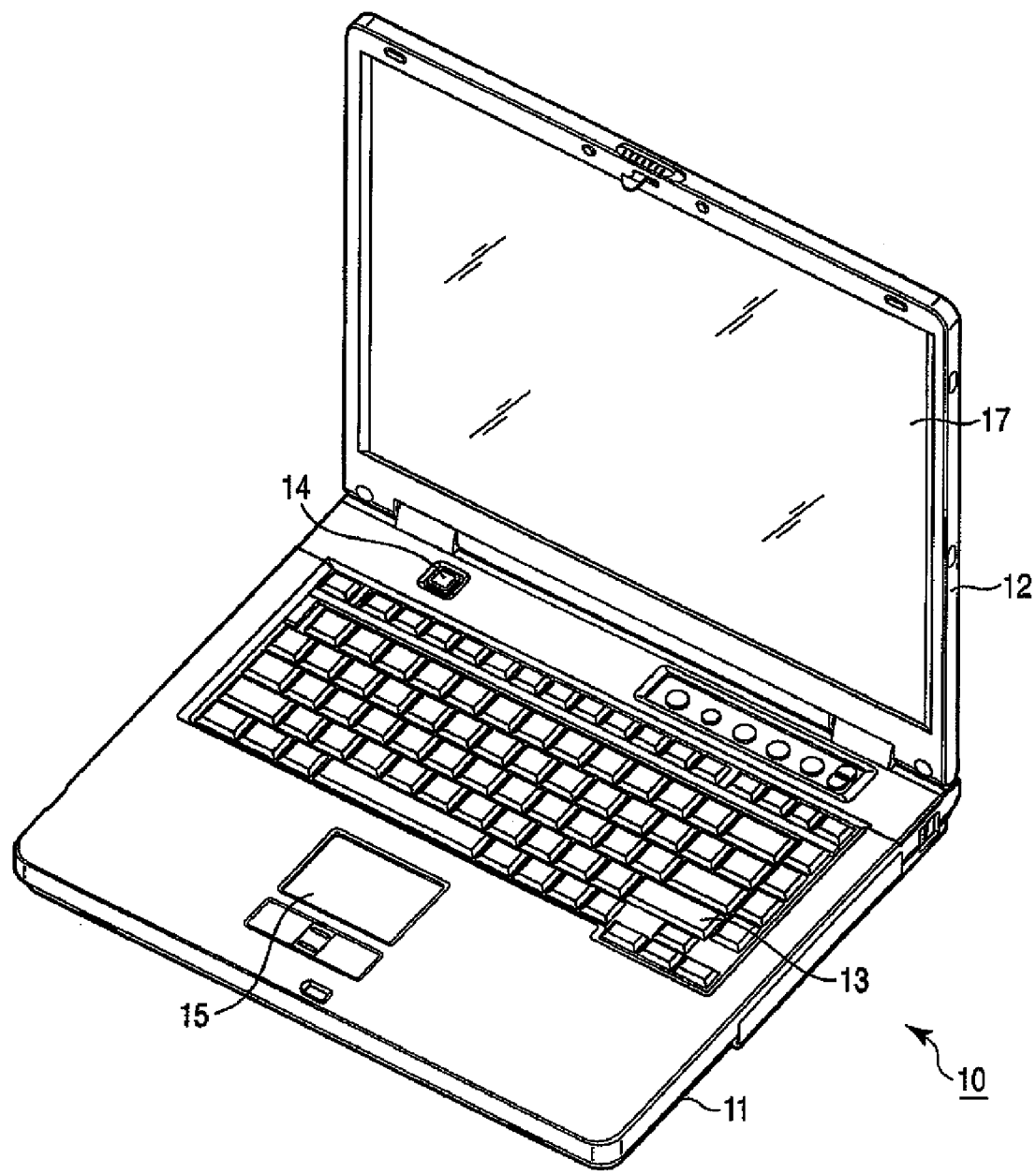
FIG. 1 is an exemplary perspective view showing an exemplary outer appearance of a computer according to an embodiment of the present invention.

FIG. 1 is a perspective view of the computer 10 with a display unit being open. The computer 10 comprises a main body 11 and a display unit 12. The display unit 12 incorporates a display device formed from an LCD (Liquid Crystal Display) 17. The display screen of the LCD 17 is located almost at the center of the display unit 12.

The display unit 12 is attached to the main body 11 so as to freely pivot between an open position and a close position. The main body 11 has, for example, a thin box-shaped case to which a battery is detachably attached. The battery is attached to a battery accommodation space provided in, e.g., the bottom surface of the main body 11. To charge the battery, an AC adapter serving as an external power supply is connected. The connection terminal for the AC adapter is provided on, e.g., the rear surface of the computer 10.

A keyboard 13, a power button switch 14 to power on/off the computer 10, and a touch pad 15 are arranged on the upper surface of the main body 11.

The system configuration of the computer 10 will be described with reference to FIG. 2.

As shown in FIG. 2, the computer 10 comprises a CPU 111, a north bridge 114, a main memory 115, a graphics controller 116, a south bridge 117, a BIOS-ROM 120, a hard disk drive (HDD) 121, an optical disk drive (ODD) 122, various PCI devices 123, an embedded controller/keyboard controller IC (EC/KBC) 140, a power supply controller (PSC) 141, a power supply circuit 142, an AC adapter (external power supply) 143, a battery 150, and the like.

The CPU 111 is a processor configured to control the operation of the computer 10 and executes an operating system and various application programs which are loaded from the HDD 121 to the main memory 115. The CPU 111 also executes a system BIOS (Basic Input Output System) stored in the BIOS-ROM 120. The system BIOS is a program to control the hardware.

The north bridge 114 is a bridge device which connects the local bus of the CPU 111 to the south bridge 117. The north bridge 114 incorporates a memory controller that controls access to the main memory 115. The north bridge 114 also has a function of executing communication with the graphics controller 116 via a PCI Express bus or the like.

The graphics controller 116 is a display controller which controls the LCD 17 serving as the display monitor of the computer 10. The graphics controller 116 includes a video memory (VRAM) 116A. A video signal that forms a display image to be displayed on the LCD 17 is generated from display data stored in the video memory (VRAM) 116A by the OS/application program.

The south bridge 117 is connected to a PCI bus 1 to execute communication with the PCI device 123 via the PCI bus 1. The south bridge 117 incorporates an IDE (Integrated Drive Electronics) controller and a serial ATA controller to control the hard disk drive (HDD) 121 and the optical disk drive (ODD) 122.

The embedded controller/keyboard controller IC (EC/KBC) 140 is a one-chip microcomputer on which an embedded controller for power management and a keyboard controller to control the keyboard (KB) 13 and the touch pad 15 are integrated. The EC/KBC 140 has a function of powering on/off the computer 10 in accordance with a user operation on the power button switch 14. Power on/off control of the computer 10 is executed by the cooperation of the EC/KBC 140 and the power supply controller (PSC) 141. Upon receiving an ON signal transmitted from the EC/KBC 140, the power supply controller (PSC) 141 powers on the computer 10 by controlling the power supply circuit 142. Upon receiving an OFF signal transmitted from the EC/KBC 140, the power supply controller (PSC) 141 powers off the computer 10 by controlling the power supply circuit 142.

The power supply controller (PSC) 141 also has a function of determining whether the battery 150 is attached to the main body 11 and a function of determining whether the external power supply (AC adapter 143) is connected to the main body 11. The power supply controller (PSC) 141 sets the determination result in the status register in the EC/KBC 140.

The power supply circuit 142 generates an operation power to each component. The power supply circuit 142 generates the operation power using a power from the battery 150 attached to the main body 11 or a power from the AC adapter 143 connected to the main body 11 as an external power supply.

When the external power supply (AC adapter 143) is connected to the main body 11, the power supply circuit 142 generates an operation power to each component using a power from the external power supply. The power supply circuit 142 also charges the battery 150 using a power from the external power supply. When the external power supply (AC adapter 143) is connected to the main body 11, the computer main body 11 and the battery 150 support a quick charge. For this reason, an AC adapter supporting a quick charge or an AC adapter supporting not a quick charge but only a normal charge is connected to the main body 11. In this case, the power supply circuit 142 has a function of determining whether the AC adapter supports a quick charge.

The battery 150 includes a plurality of secondary cells and a nonvolatile memory 151. The nonvolatile memory 151 stores rating information representing the capability of the battery 150 in advance. The rating information includes, for example, a discharge current rating (A) representing the maximum discharge current of the battery 150, the rated capacity (Ah) of the battery 150, cell count information representing the number of secondary cells mounted in the battery 150, a cycle count representing the number of times of charge/discharge execution, and the sum of use times of the battery 150.

The EC/KBC 140, power supply controller (PSC) 141, power supply circuit 142, and battery 150 are connected to each other via a serial bus 2 such as an I²C bus. During the period the battery 150 is being attached to the main body 11 or during the period the AC adapter 143 is being connected to the main body 11, the power supply circuit 142 always supplies an operation power to the EC/KBC 140 and the power supply controller (PSC) 141.

Figure 3:
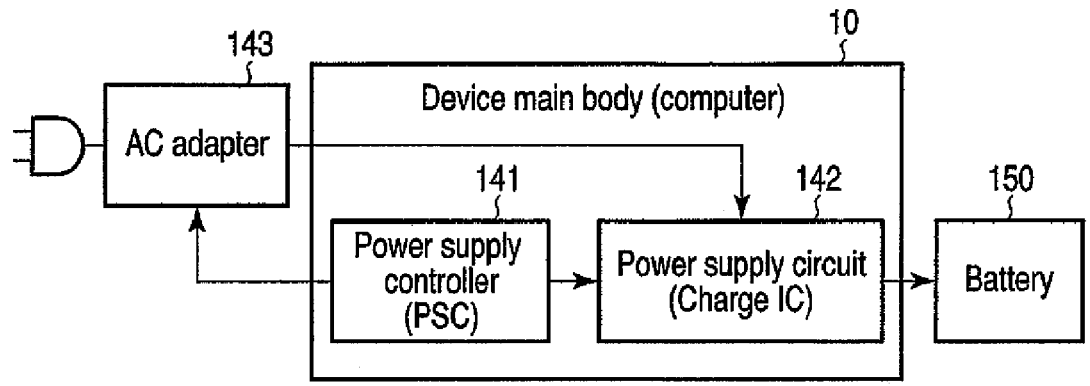
FIG. 3 is an exemplary block diagram showing an exemplary arrangement mainly including an AC adapter, a power supply controller (PSC), and a power supply circuit used in the computer shown in FIG. 1.

FIG. 3 is a block diagram showing an arrangement including the AC adapter 143, power supply controller (PSC) 141, and power supply circuit (charge IC) 142.

The AC adapter 143 supplies a power to the power supply circuit 142. The power supply circuit 142 converts the supplied power into a charge current to charge the battery 150. The power supply controller (PSC) 141 sets a charge current value in the power supply circuit 142. The power supply controller 141 also monitors the voltage value of the AC adapter 143. The power supply controller 141 controls the power supply circuit 142 to supply a test charge current to the battery 150, thereby acquiring the voltage drop value of the AC adapter 143. If the acquired voltage drop value of the AC adapter 143 is smaller than a threshold, the power supply controller 141 determines that the connected AC adapter 143 supports a quick charge, and sets a charge current value in the power supply circuit 142 for a quick charge (to be described later).

Figure 4:
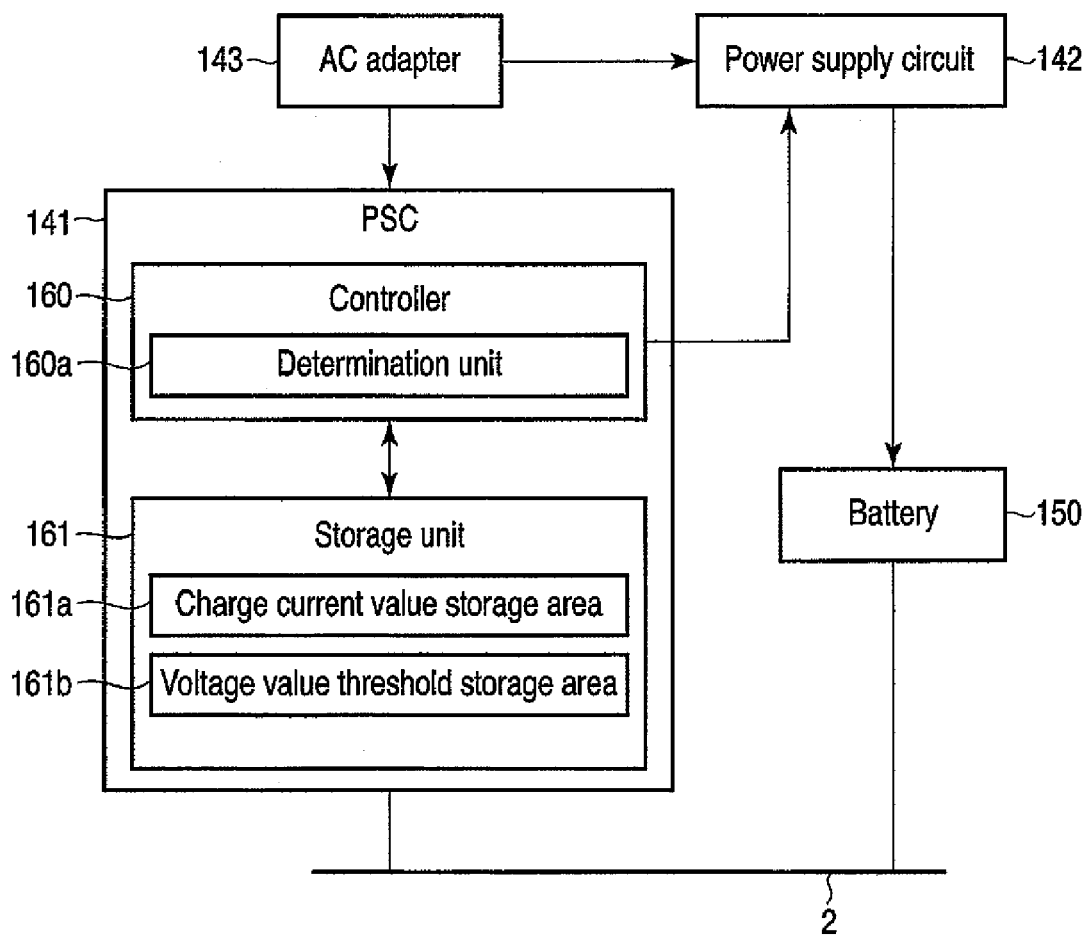
FIG. 4 is an exemplary block diagram more specifically showing the exemplary arrangement mainly including the AC adapter, power supply controller (PSC), and power supply circuit used in the computer shown in FIG. 1.

FIG. 4 is a block diagram showing details of the arrangement including the AC adapter 143, power supply controller (PSC) 141, and power supply circuit 142.

The power supply circuit 142 converts (DC/DC converts) a power supplied from the AC adapter 143 to generate a charge current. The battery 150 is charged by the charge current generated by the power supply circuit 142. If the AC adapter 143 supporting a quick charge is used to charge the battery 150, the power supply controller (PSC) 141 supplies a large charge current (first charge current) to the battery 150. On the other hand, if the AC adapter 143 which does not support a quick charge is used to charge the battery 150, the power supply controller (PSC) 141 supplies a charge current (second charge current) smaller than the first charge current to the battery 150. The power supply controller (PSC) 141 also determines whether the AC adapter 143 supports a quick charge. The determination processing is done by using a test charge current which is not used to charge the battery 150. As the test charge current, a charge current (third or fourth charge current) smaller than the second charge current is used. Note that the first charge current preferably uses, as its current value, one of the upper limit value of the charge current value of the battery 150 and the upper limit value of the current set value of the power supply circuit 142.

The power supply controller (PSC) 141 comprises a controller 160 and a storage unit 161. The controller 160 comprises a determination unit 160a. The determination unit 160a determines whether the connected AC adapter 143 supports a quick charge. The determination processing is done by supplying the above-described test charge current to the battery 150 and acquiring a voltage drop value of the AC adapter 143. The storage unit 161 comprises a charge current value storage area 161a and a voltage threshold storage area 161b. The charge current value storage area 161a stores various kinds of charge currents. For example, the charge current value storage area 161a stores a charge current value (first charge current value) for a quick charge, a charge current (second charge current value) for a normal charge, a test charge current value (third or fourth charge current value), and the like. The voltage threshold storage area 161b stores a voltage threshold. One or two or more voltage thresholds are stored in the voltage threshold storage area 161b.

The power supply circuit 142 supplies, to the battery 150, the first charge current for a quick charge and the second charge current for a normal charge which is smaller than the first charge current. The power supply controller 141 compares a first voltage value of the AC adaptor 143 wherein the power supply circuit 142 supplies, to the battery 150, the third charge current which is smaller than the second charge current and a second voltage value of the AC adaptor 143 wherein the power supply circuit 142 does not supply a charge current to the battery 150. If the difference between the first voltage value and the second voltage value is smeller than the voltage threshold, the power supply controller 141 determines that the AC adapter 143 supports a quick charge. The supply controller 141 then supplies the first charge current to the battery 150 to quickly charge the battery 150.

The power supply circuit 142 supplies, to the battery 150, the first charge current for a quick charge and the second charge current for a normal charge which is smaller than the first charge current. The controller 160 compares a first voltage value of the AC adaptor 143 wherein the power supply circuit 142 supplies, to the battery 150, the third charge current which is smaller than the second charge current and a second voltage value of the AC adaptor 143 wherein the power supply circuit 142 supplies, to the battery 150, the fourth charge current which is smaller than the third charge current. If the difference between the first voltage value and the second voltage value is smaller than the voltage threshold, the controller 160 determines that the AC adapter 143 supports a quick charge. The controller 160 then supplies the first charge current to the battery 150 to perform a quick charge.

Figure 5:
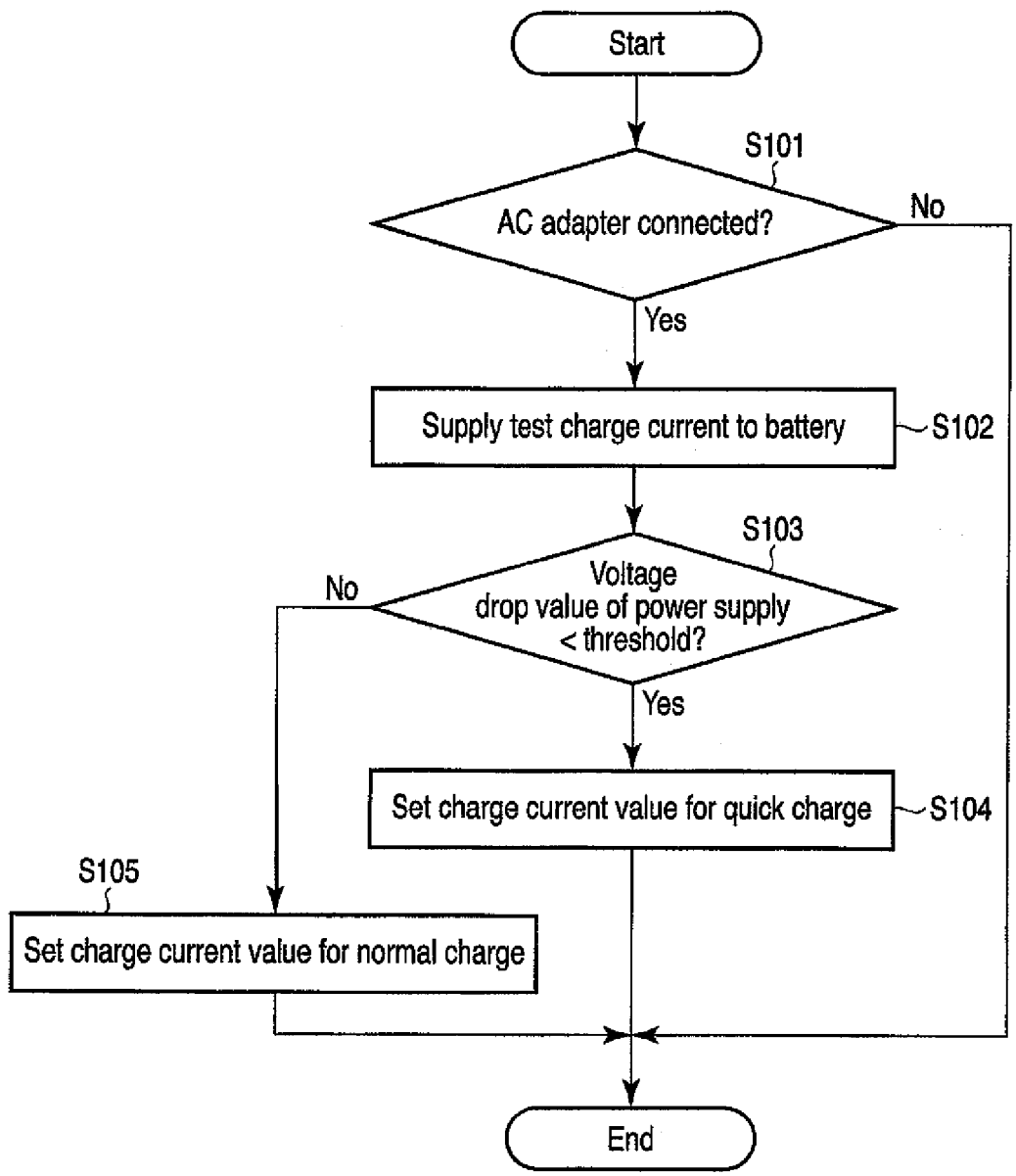
FIG. 5 is an exemplary flowchart illustrating an exemplary procedure of charge control processing executed by the computer shown in FIG. 1.

An example of the procedure of charge control processing of charging the battery 150 by appropriately controlling the AC adapter 143 will be explained with reference to the flowchart in FIG. 5.

The power supply controller (PSC) 141 determines whether the AC adapter 143 is attached to the main body 11 (block S101). The power supply controller (PSC) 141 monitors, e.g., the voltage value of one of electrodes for communication with the AC adapter 143, and when the voltage value has changed to a predetermined logic level, determines that the AC adapter 143 is attached to the main body 11. Even in a state in which the external power supply (AC adapter 143) is not connected to the main body 11, when the battery 150 is attached, an operation power is supplied to the power supply controller (PSC) 141 and the EC/KBC 140 at that point of time. Hence, even if the external power supply (AC adapter 143) is not connected to the main body 11, the power supply controller (PSC) 141 can detect attachment of the battery 150 to the main body 11.

Upon determining in block S101 that the AC adapter 143 is attached to the main body 11 (YES in block S101), the power supply controller (PSC) 141 sets, in the power supply circuit 142, the test charge current value stored in the storage unit 161 to supply the test charge current to the battery 150 (block S102). When the test charge current is supplied to the battery 150, the power supply controller (PSC) 141 monitors the voltage of the power supply of the AC adapter 143 and measures the voltage drop value of the AC adapter 143. As the voltage drop value of the AC adapter 143, the difference value between the first voltage value and the second voltage value is calculated. The first voltage value is, e.g., the voltage value of the AC adapter 143 when the test charge current (third charge current) is being supplied from the power supply circuit 142 to the battery 150. The second voltage value is, e.g., the voltage value of the AC adapter 143 when no charge current is being supplied from the power supply circuit 142 to the battery 150.

Upon determining in block S103 that the measured voltage drop value of the AC adapter 143 is smaller than the voltage threshold stored in the storage unit 161 (YES in block S103), the power supply controller (PSC) 141 sets, in the power supply circuit 142, the charge current value (first charge current value: for example, 10 A) for a quick charge stored in the storage unit 161. The power supply controller (PSC) 141 then causes the power supply circuit 142 to supply the charge current for a quick charge to the battery 150 (block S104). On the other hand, upon determining in block S103 that the measured voltage drop value of the AC adapter 143 is equal to or larger than the voltage threshold stored in the storage unit 161 (NO in block S103), the power supply controller (PSC) 141 sets, in the power supply circuit 142, the charge current value (second charge current value: for example, 3 A) for a normal charge stored in the storage unit 161. The power supply controller (PSC) 141 then causes the power supply circuit 142 to supply the charge current for a normal charge to the battery 150 (block S105).

Figure 6:
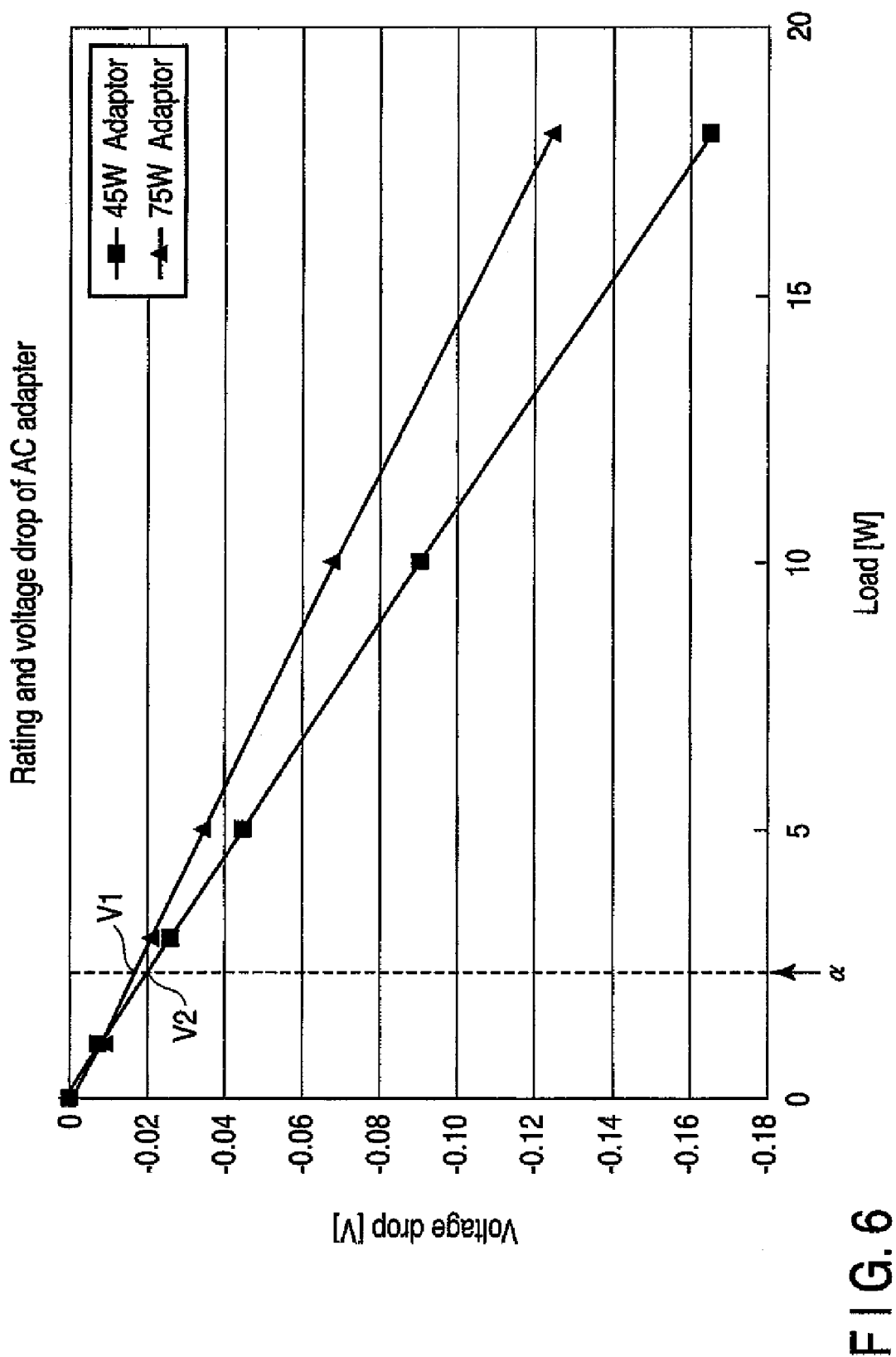
FIG. 6 is an exemplary graph showing examples of the data of the rating and voltage drop of the AC adapter.

The voltage drop value of the AC adapter 143 will be explained here. FIG. 6 is a graph showing examples of the data of the rating and voltage drop of the AC adapter 143. An AC adapter (75 W Adapter) supporting a quick charge and an AC adapter (45 W Adapter) supporting only a normal charge exhibit the graph shown in FIG. 6. More specifically, the AC adapter supporting a quick charge exhibits a power supply voltage drop value smaller than that of the AC adapter supporting only a normal charge. The threshold of the voltage drop value of the AC adapter 143 is, e.g., 20 mV. When a test charge current 2 A is supplied to the battery 150, the voltage drop value of the AC adapter 143 with respect to a load α is V1 (AC adapter (75 W Adapter) supporting a quick charge) or V2 (AC adapter (45 W Adapter) supporting only a normal charge). For example, when no charge current is supplied to the battery 150, the voltage drop value of the AC adapter 143 is 0. Hence, V1 satisfies V1−V0=V1 (in the inoperative state of the computer 10). Similarly, V2 satisfies V2−V0=V2. As shown in FIG. 6, since V1 is smaller than the threshold, i.e., 20 mV (0.02 V), the AC adapter (75 W Adaptor) is determined as an adapter supporting a quick charge. Since V2 is equal to or larger than the threshold, i.e., 20 mV (0.02 V), the AC adapter (45 W Adaptor) is determined as an adapter supporting only a normal charge. Note that when the computer 10 has been powered on and is operating, the charge current is the remainder of power after subtracting power to be consumed by the computer 10. Hence, the charge current value is set at 0 ampere initially and then gradually raised. In the process of gradually raising the charge current value, the voltage drop value of the AC adapter 143 is measured.

According to the above-described embodiment, it is possible to appropriately control battery charge in accordance with the performance of the connected AC adapter. For example, when quickly charging the battery indoors using a large AC adapter supporting a quick charge or performing charge outdoors using a small portable AC adapter supporting only a normal charge, an appropriate charge control can be done automatically using a plurality of existing AC adapters having different characteristics without making the user conscious of it.

A modification of the above-described embodiment will be described next. In the above-described embodiment, for example, the voltage drop value of the power supply is calculated by defining V1−V0=V1 (in the inoperative state of the computer 10) because the voltage drop value of the AC adapter 143 is 0 without charge current supply to the battery 150. However, if the value V0 cannot necessarily be determined as 0 A because, e.g., the computer 10 is operating, the voltage drop value of the AC adapter 143 may be measured using two test charge current values. More specifically, when the difference value between the first voltage value (V2) and the second voltage value (V1) is smaller than the threshold, the AC adapter 143 is determined as an adapter supporting a quick charge. Note that the first voltage value (V2) is the voltage value of the AC adapter 143 when the third charge current (test charge current value 1) is being supplied from the power supply circuit 142 to the battery 150. The second voltage value (V1) is the voltage value of the AC adapter 143 when the fourth charge current (test charge current value 2) smaller than the third charge current is being supplied from the power supply circuit 142 to the battery 150.

This enables to determine whether the AC adapter 143 supports a quick charge even if the value V0 cannot necessarily be determined as 0 A because, e.g., the computer 10 is operating.

Another modification will be described. In the above-described embodiment, one threshold is set for the voltage drop value (difference value) of the AC adapter 143 to discriminate between two kinds of AC adapters. Alternatively, a plurality of thresholds may be set. More specifically, to set two thresholds, a first threshold and a second threshold larger than the first threshold are set. Then, the controller determines three cases, i.e., a case in which the difference value is smaller than the first threshold, a case in which the difference value is first threshold or more and smaller than the second threshold, and a case in which the difference value is the second threshold or more. Determining the three cases makes it possible to discriminate between three kinds of AC adapters and charge the battery 150 using charge currents corresponding to these AC adapters.

The electronic device of the embodiment is not limited to the computer 10 but can also be implemented by various electronic devices such as a PDA (Personal Digital Assistant).

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device powered by an external power supply and a battery chargeable by the external power supply, comprising:
    a power supply configured to supply, to the battery using power from the external power supply, a first charge current for a fast charge or a second charge current for a normal charge smaller than the first charge current; and
    a controller configured to control the power supply;
    wherein the controller is configured to control the power supply in order to supply the first charge current to the battery when a difference between a first voltage of the external power supply when a third charge current smaller than the second charge current is supplied to the battery and a second voltage of the external power supply when the first charge current and the second charge current are not supplied to the battery is smaller than a threshold.

2. The device of claim 1, wherein the first charge current is either an upper limit of a charge current of the battery or an upper limit of a predetermined current range of the power supply.

3. The device of claim 1, wherein the controller is configured to determine that the external power supply does not support the fast charge when the difference is larger than the threshold, and to supply the second charge current to the battery.

4. The device of claim 1, wherein the controller is configured to determine three patterns comprising a first pattern comprising the difference smaller than a first threshold, a second pattern comprising the difference equal to or larger than the first threshold and smaller than a second threshold which is larger than the first threshold, and a third pattern comprising the difference equal to or larger than the second threshold, and to charge the battery using charge currents corresponding to three kinds of external power supplies.

5. The device of claim 1, wherein the difference comprises an amount of a voltage drop of the external power supply.

6. An electronic device powered by a battery and an external power supply and a battery chargeable by the external power supply, comprising:
    a power supply configured to supply, to the battery using a power from the external power supply, a first charge current for a fast charge or a second charge current for a normal charge smaller than the first charge current; and
    a controller configured to control the power supply;
    wherein the controller is configured to control the power supply in order to supply the first charge current to the battery when a difference between a first voltage of the external power supply when a third charge current smaller than the second charge current is supplied to the battery and a second voltage of the external power supply when the first charge current and the second charge current are not supplied to the battery is smaller than a threshold.

7. The device of claim 6, wherein the first charge current is either an upper limit of a charge current of the battery or an upper limit of a predetermined current range of the power supply.

8. The device of claim 6, wherein the controller is configured to determine that the external power supply does not support the fast charge when the difference is larger than the threshold, and to supply the second charge current to the battery.

9. The device of claim 6, wherein the controller is configured to determine three patterns comprising a first pattern comprising the difference smaller than a first threshold, a second pattern comprising the difference equal to or larger than the first threshold and smaller than a second threshold which is larger than the first threshold, and a third pattern comprising the difference equal to or larger than the second threshold, and to charge the battery using charge currents corresponding to three kinds of external power supplies.

10. The device of claim 6, wherein the difference comprises an amount of a voltage drop of the external power supply.

* * * * *